US010323569B2

(12) United States Patent
King

(10) Patent No.: US 10,323,569 B2
(45) Date of Patent: Jun. 18, 2019

(54) CORE ASSEMBLIES AND GAS TURBINE ENGINE COMPONENTS FORMED THEREFROM

(71) Applicant: United Technologies Corporation, Farmington, CT (US)

(72) Inventor: Christopher King, Bristol, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 358 days.

(21) Appl. No.: 15/283,837

(22) Filed: Oct. 3, 2016

(65) Prior Publication Data

US 2017/0335765 A1 Nov. 23, 2017

Related U.S. Application Data

(63) Continuation-in-part of application No. 15/159,890, filed on May 20, 2016.

(51) Int. Cl.
*B22C 9/10* (2006.01)
*F02C 3/04* (2006.01)
*F02C 7/12* (2006.01)

(52) U.S. Cl.
CPC ............. *F02C 3/04* (2013.01); *B22C 9/103* (2013.01); *F02C 7/12* (2013.01);
(Continued)

(58) Field of Classification Search
CPC .... F02C 3/04; F02C 7/12; B22C 9/103; F05B 2230/211; F05D 2220/32; F05D 2230/20;
(Continued)

(56) References Cited

U.S. PATENT DOCUMENTS 2,882,242 A * 4/1959 Weber .................. B01J 21/02
502/210
2,888,242 A * 5/1959 Williams ............... F01D 5/187
416/236 R
(Continued)

FOREIGN PATENT DOCUMENTS

EP 1524046 A1 4/2005
EP 1652603 A2 5/2006
(Continued)

OTHER PUBLICATIONS

Han, et al., "Gas Turbine Heat Transfer and Cooling Technology" (2000); 159 pages.
(Continued)

*Primary Examiner* — Richard A Edgar
(74) *Attorney, Agent, or Firm* — Cantor Colburn LLP

(57) ABSTRACT

Core assemblies and methods for manufacturing components of gas turbine engines include a first core body having a first trunk configured to attach to a first location of a cavity core structure, a first branch extending from the first trunk and configured to form a first portion of a first cooling circuit, the first branch having a first joining surface, and a second core body having a second trunk configured to attach to a second location of a cavity core structure, a first branch of the second core body extending from the second trunk and configured to form a first portion of a second cooling circuit in the component. The first branches of the core bodies joined to form a junction. The junction defines a merger of the first cooling circuit and the second cooling circuit proximate to an exit of the first and second cooling circuits.

15 Claims, 14 Drawing Sheets

(52) U.S. Cl.
CPC ..... *F05B 2230/211* (2013.01); *F05D 2220/32* (2013.01); *F05D 2230/20* (2013.01); *F05D 2260/202* (2013.01); *F05D 2300/13* (2013.01)

(58) Field of Classification Search
CPC ........... F05D 2260/202; F05D 2300/13; F05D 2260/204; F01D 5/187; F01D 5/186
See application file for complete search history.

(56) References Cited

U.S. PATENT DOCUMENTS

| | | | |
|---|---|---|---|
| 6,913,064 B2* | 7/2005 | Beals | B22C 9/04 |
| | | | 164/131 |
| 7,014,424 B2* | 3/2006 | Cunha | B22C 9/103 |
| | | | 415/115 |
| 7,303,375 B2 | 12/2007 | Cunha et al. | |
| 7,322,795 B2 | 1/2008 | Luczak et al. | |
| 7,556,476 B1* | 7/2009 | Liang | F01D 5/188 |
| | | | 415/115 |
| 7,731,481 B2 | 6/2010 | Cunha et al. | |
| 8,449,254 B2 | 5/2013 | Devore et al. | |
| 9,970,302 B2* | 5/2018 | Lacy | F01D 5/187 |
| 2014/0072447 A1 | 3/2014 | Propheter-Hinckley | |

FOREIGN PATENT DOCUMENTS

| | | |
|---|---|---|
| EP | 2011586 A1 | 1/2009 |
| EP | 2565383 A2 | 3/2013 |
| WO | 2014039124 A1 | 3/2014 |

OTHER PUBLICATIONS

European Search Report, European Application No. 17172277.0, dated Oct. 12, 2017, European Patent Office; European Search Report 7 pages.

* cited by examiner

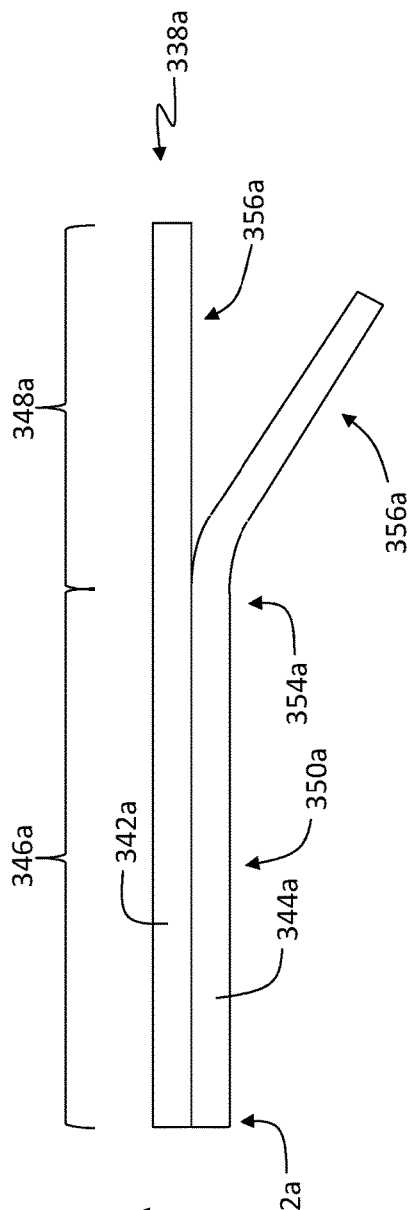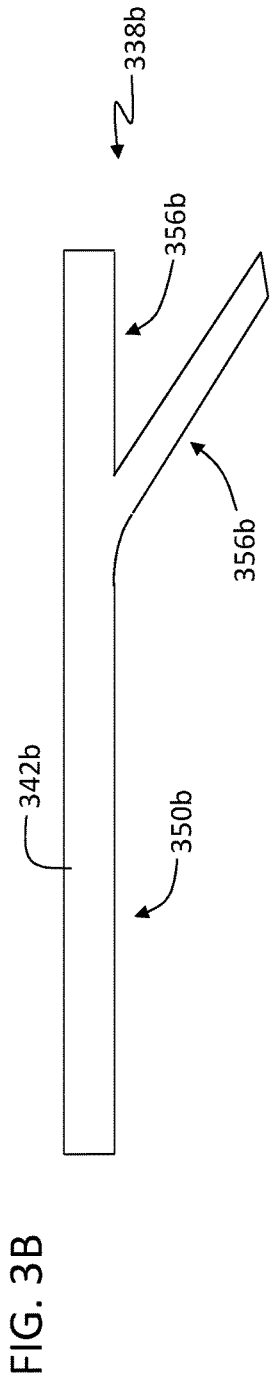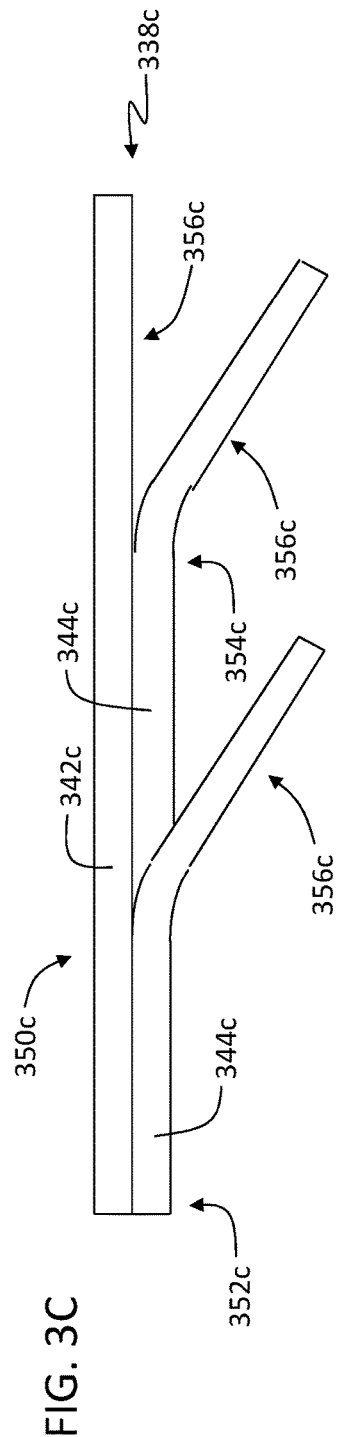

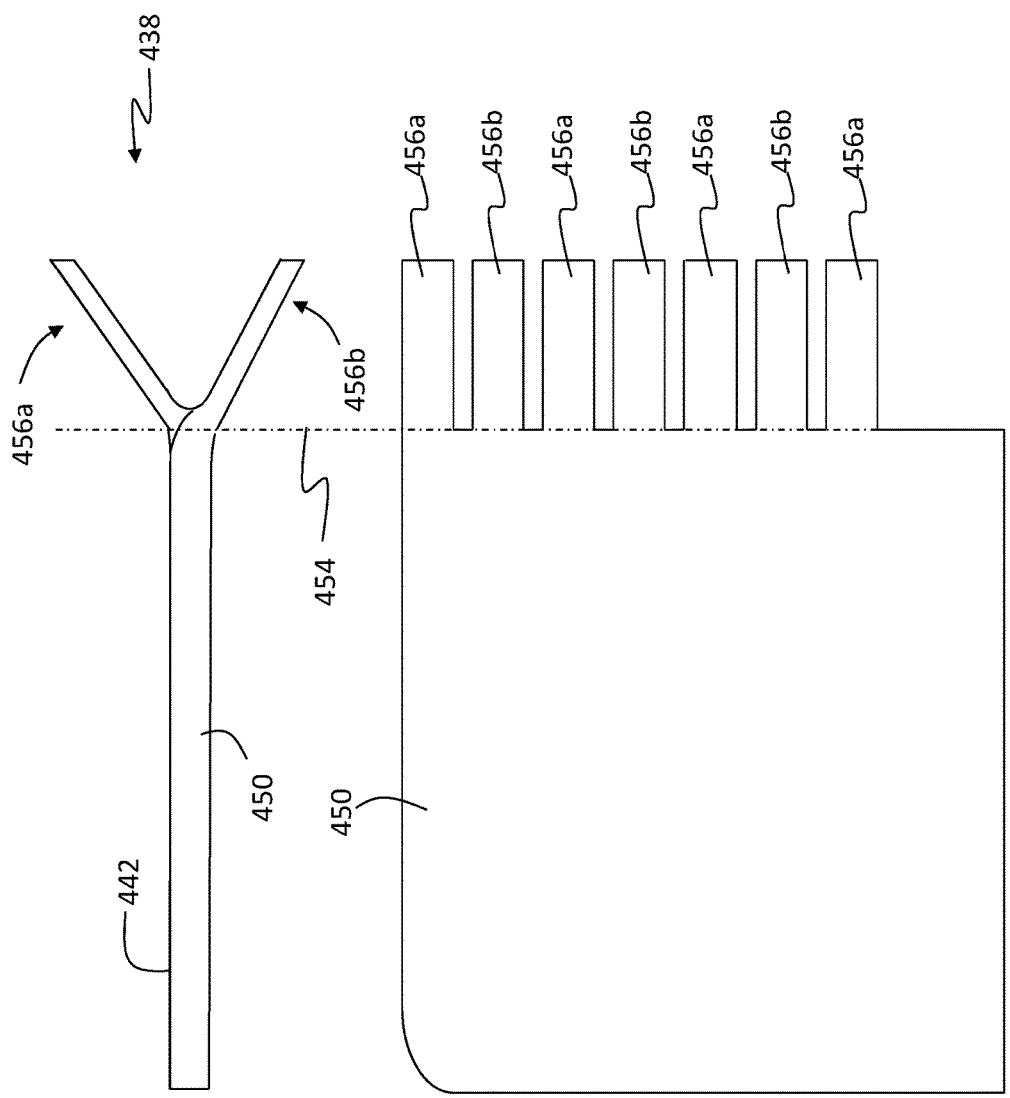

CORE ASSEMBLIES AND GAS TURBINE ENGINE COMPONENTS FORMED THEREFROM

CROSS-REFERENCE TO RELATED APPLICATIONS

This application is a continuation-in-part application of the legally related U.S. Ser. No. 15/159,890 filed May 20, 2016, the contents of which are incorporated by reference herein in their entirety.

BACKGROUND

The subject matter disclosed herein generally relates to gas turbine engine components and, more particularly, to core assemblies, core subassemblies, and core bodies for manufacturing components of gas turbine engines.

Turbine engine components, such as turbine blades and vanes, are operated in high temperature environments. To avoid deterioration in the components resulting from their exposure to high temperatures, it is necessary to provide cooling circuits within the components. Turbine blades and vanes are subjected to high thermal loads on both the suction and pressure sides of their airfoil portions and at both the leading and trailing edges. The regions of the airfoils having the highest thermal load can differ depending on engine design and specific operating conditions.

Refractory metal core technology offers the potential to provide higher specific cooling passages for turbine components such as blade and vane airfoils and seals. Refractory metal core technology allows cooling circuits to be placed just under the surface of the airfoil through which cooling air flows and is expelled into the gaspath. Improved cooling circuits within turbine components may be advantageous.

SUMMARY

In accordance with an embodiment, core assemblies for manufacturing components of gas turbine engines are provided. The core assemblies include a first core body having a first trunk configured to attach to a first location of a cavity core structure, a first branch of the first core body extending from the first trunk and configured to form a first portion of a first cooling circuit in the component, the first branch having a first joining surface and a second core body having a second trunk configured to attach to a second location of a cavity core structure, a first branch of the second core body extending from the second trunk and configured to form a first portion of a second cooling circuit in the component, the first branch of the second core body having a second joining surface joined to the first joining surface to form a junction. The junction defines a merger of the first cooling circuit and the second cooling circuit proximate to an exit of the first and second cooling circuits from the component.

In addition to one or more of the features described herein, or as an alternative, further embodiments of the core assemblies may include that the first core body includes a second branch extending from the first trunk to define a second exit of the first cooling circuit.

In addition to one or more of the features described herein, or as an alternative, further embodiments of the core assemblies may include that the second exit is formed in one of a pressure side surface or a suction side surface of the component.

In addition to one or more of the features described herein, or as an alternative, further embodiments of the core assemblies may include that the second core body includes a second branch extending from the second trunk to define a second exit of the second cooling circuit.

In addition to one or more of the features described herein, or as an alternative, further embodiments of the core assemblies may include that the second exit of the first cooling circuit and the second exit of the second cooling circuit are on opposite side surfaces of the component.

In addition to one or more of the features described herein, or as an alternative, further embodiments of the core assemblies may include that at least one of the first core body and the second core body is a refractory metal core.

In addition to one or more of the features described herein, or as an alternative, further embodiments of the core assemblies may include that the first core body and the second core body are attached at the junction by at least one of welding, gluing, forging, pressing, laser operations, or mechanical attachment.

In addition to one or more of the features described herein, or as an alternative, further embodiments of the core assemblies may include that at least one of the first core body and the second core body includes a plurality of openings configured to form a plurality of air disturbance features in the component.

In addition to one or more of the features described herein, or as an alternative, further embodiments of the core assemblies may include that the first location is on a first internal cavity core structure and the second location is on a second internal cavity core structure that is different from the first internal cavity core structure.

In addition to one or more of the features described herein, or as an alternative, further embodiments of the core assemblies may include that the first location and the second location are different locations on a single internal cavity core structure.

In addition to one or more of the features described herein, or as an alternative, further embodiments of the core assemblies may include that the first location and the second location are different from each other.

According to another embodiment, components for gas turbine engines are provided. The components include a cavity formed inside the component and defining a cooling flow path within the component, a first cooling circuit fluidly connecting the cavity to an exterior of the component, wherein the first cooling circuit comprises a first portion and a second portion wherein the first portion of the cooling circuit and the second portion of the cooling circuit are configured to define a first exit and a second exit at two different locations on the exterior of the component, and wherein the first portion and the second portion extend from a trunk portion of the first cooling circuit, and a second cooling circuit formed within the component and merging with the first cooling circuit proximate the first exit of the first cooling circuit.

In addition to one or more of the features described herein, or as an alternative, further embodiments of the components may include that at least one of the trunk portion, the first portion of the cooling circuit, or the second portion of the cooling circuit includes a plurality of air disturbance features in the cooling circuit.

In addition to one or more of the features described herein, or as an alternative, further embodiments of the components may include that the second cooling circuit is fluidly connected to the cavity at a location different from a location where the first cooling circuit fluidly connects to the cavity.

In addition to one or more of the features described herein, or as an alternative, further embodiments of the components may include that the second cooling circuit is fluidly connected to a second cavity different from the cavity the first cooling circuit is fluidly connected to.

In addition to one or more of the features described herein, or as an alternative, further embodiments of the components may include that the first exit is on an end of the component and the second exit of the first cooling circuit is on a pressure side surface or suction side surface of the component.

In addition to one or more of the features described herein, or as an alternative, further embodiments of the components may include that the second cooling circuit has a second exit separate from the location of the merging with the first cooling circuit.

According to another embodiment, methods of manufacturing components for gas turbine engines are provided. The methods include forming a core assembly having a first core body with a trunk that attaches to a cavity core structure, a first branch extending from the trunk and configured to form a first portion of a first cooling circuit in the component, and a second branch extending from the trunk and configured to form a second portion of the first cooling circuit in the component, the first branch of the first core body having a first joining surface, attaching a second core body to the first core body at the first joining surface to form a junction, the second core body configured to define a second cooling circuit within the component, and attaching the first core body to a cavity core structure. The junction of the first core body and the second core body define a merging of the first and second cooling circuits proximate an end of the component.

In addition to one or more of the features described herein, or as an alternative, further embodiments of the methods may include forming the component having an interior cavity based on the cavity core structure and cooling circuits defined by the first and second core bodies.

In addition to one or more of the features described herein, or as an alternative, further embodiments of the methods may include attaching the second core body to the same cavity core structure as the first core body.

In addition to one or more of the features described herein, or as an alternative, further embodiments of the methods may include attaching the second core body to a different cavity core structure than the cavity core structure the first core body is attached to.

Technical effects of embodiments of the present disclosure include core assemblies and core bodies, such as refractory metal cores, for manufacturing components of gas turbine engines having a trunk and multiple branches extending therefrom. Further technical effects include components for gas turbine engines having a cavity and a branch portion of a cooling circuit extending therefrom with multiple branch portions of the cooling circuit extending from the trunk to define multiple, different exits on an exterior of the component. Further technical effects include cooling circuits of gas turbine engine components that can start at different locations within the component and merge proximate to an exit from the component and associated cores and core bodies to form such configurations.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 3A is a top-down schematic illustration of a core subassembly in accordance with a non-limiting embodiment of the present disclosure;

FIG. 3B is a top-down schematic illustration of another core subassembly in accordance with a non-limiting embodiment of the present disclosure;

FIG. 3C is a top-down schematic illustration of another core subassembly in accordance with a non-limiting embodiment of the present disclosure;

FIG. 4A is a top-down schematic illustration of another core subassembly in accordance with a non-limiting embodiment of the present disclosure;

FIG. 4B is a side elevation schematic illustration of the core subassembly of FIG. 4A;

DETAILED DESCRIPTION

Figure 1A:
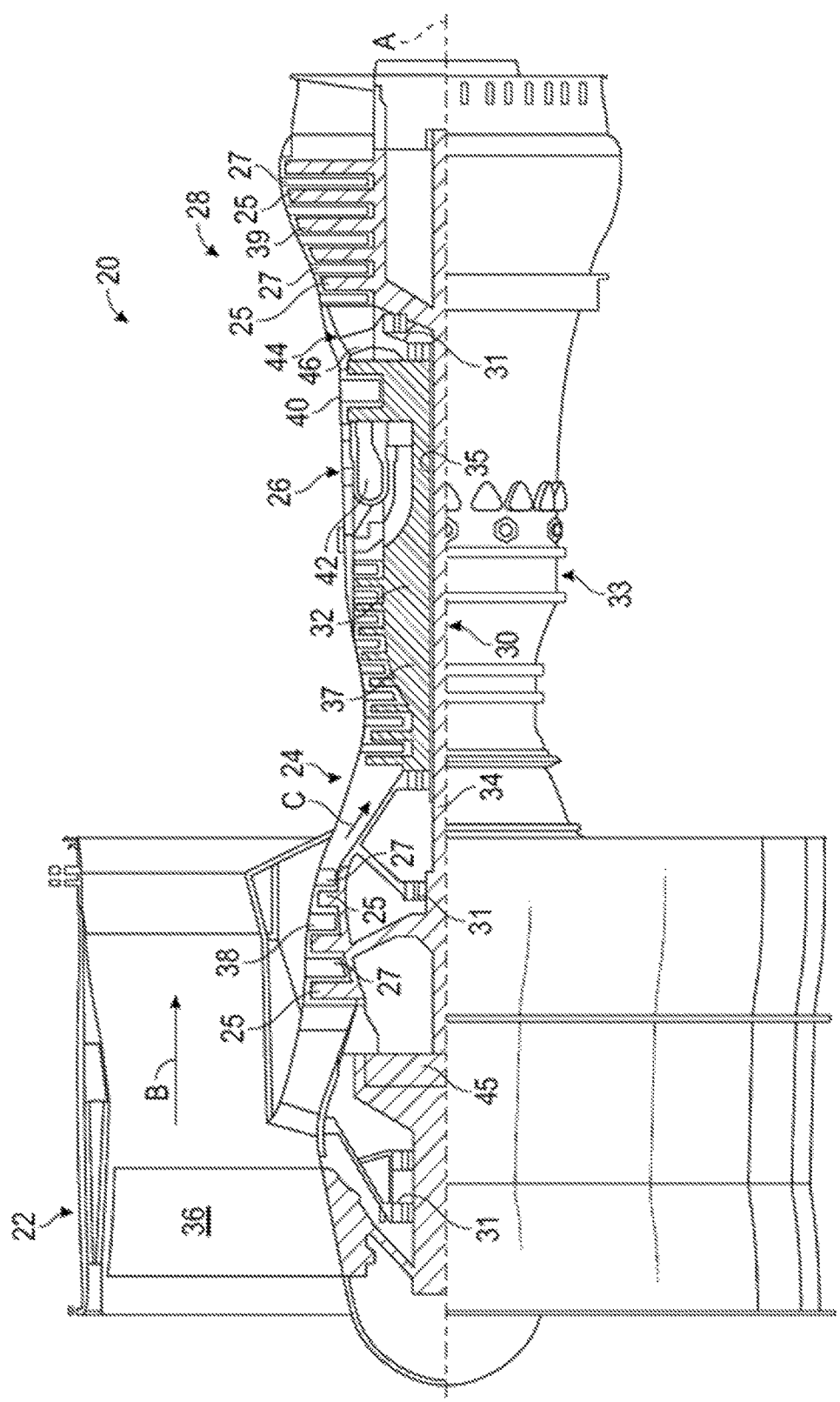
FIG. 1A is a schematic cross-sectional illustration of a gas turbine engine that may employ various embodiments disclosed herein.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1A schematically illustrates a gas turbine engine 20. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies extract energy (in the form of pressure) from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Figure 1B:
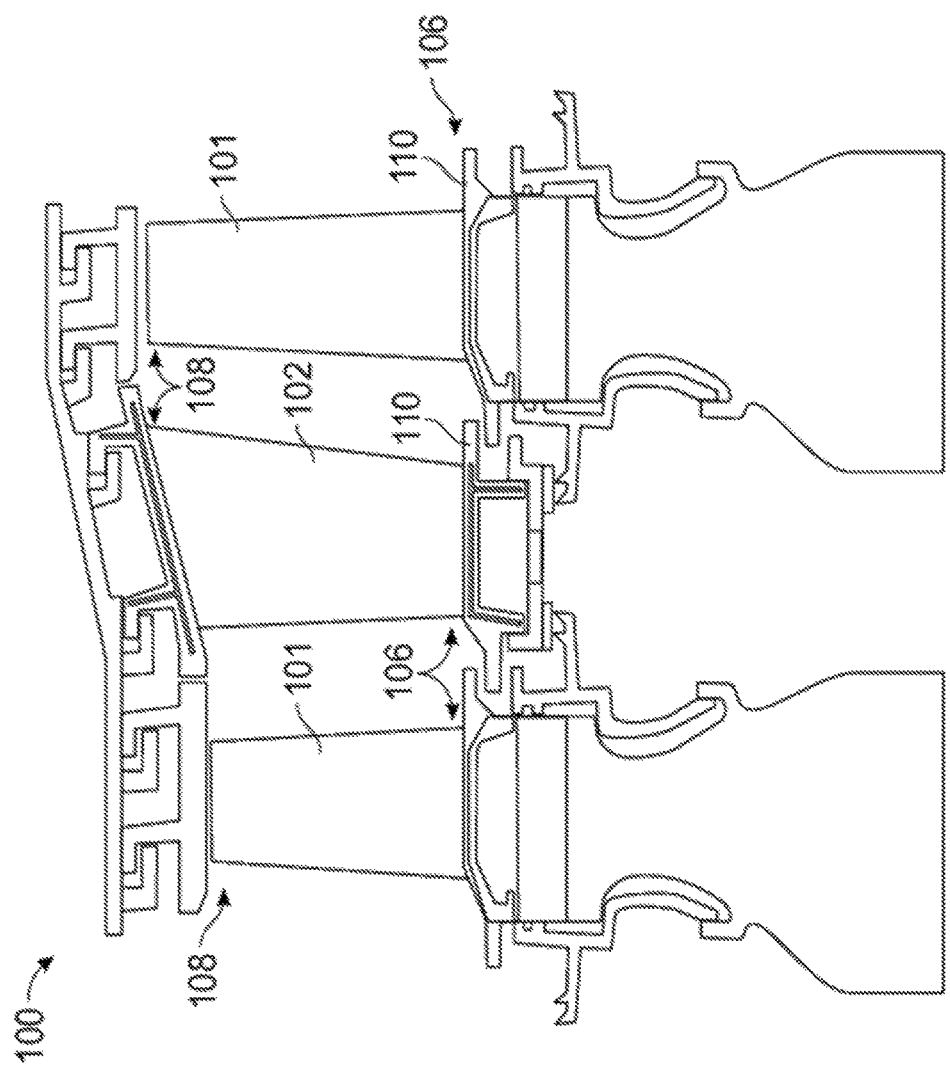
FIG. 1B is a schematic illustration of a turbine that may employ various embodiments disclosed herein.

FIG. 1B is a schematic view of a turbine section that may employ various embodiments disclosed herein. Turbine 100 includes a plurality of airfoils, including, for example, one or more blades 101 and vanes 102. The airfoils 101, 102 may be hollow bodies with internal cavities defining a number of channels or cavities, hereinafter airfoil cavities, formed therein and extending from an inner diameter 106 to an outer diameter 108, or vice-versa. The airfoil cavities may be separated by partitions within the airfoils 101, 102 that may extend either from the inner diameter 106 or the outer diameter 108 of the airfoil 101, 102. The partitions may extend for a portion of the length of the airfoil 101, 102, but may stop or end prior to forming a complete wall within the airfoil 101, 102. Thus, each of the airfoil cavities may be fluidly connected and form a fluid path within the respective airfoil 101, 102. The blades 101 and the vanes may include platforms 110 located proximal to the inner diameter or outer diameter thereof. Located below the platforms 110 may be airflow ports and/or bleed orifices that enable air to bleed from the internal cavities of the airfoils 101, 102. A root of the airfoil may connected to or be part of the platform 110.

Although an aero or aircraft engine application is shown and described above, those of skill in the art will appreciate that airfoil configurations as described herein may be applied to industrial applications and/or industrial gas turbine engines, land based or otherwise.

As noted, turbine airfoils can operate in high temperature environments that, in some circumstances, may exceed the melting point of the material of the airfoil. In order to cool the airfoil, cooling air is passed through it from the compressor. The coolant travels through the airfoil cavities which are designed to promote convective heat transfer. The cooling air can then be discharged out the airfoil through cavity slots (e.g., exits). The air exiting the slots can form a film of cooler air along surfaces of the airfoil and thus shield the airfoil from incoming hot fluids (e.g., combustion gases).

In accordance with various embodiments of the present disclosure, discharge cooling air flows can be provided to or on multiple surfaces of an airfoil by using stacked core subassemblies or bodies to form a core assembly during formation and/or manufacture of the airfoils. In some embodiments the core bodies, core subassemblies, and/or core assemblies can include refractory metal cores (RMCs). RMCs are a tool that makes a negative in the final airfoil body and the airfoil is produced from positive material. As provided herein, the cores and/or core bodies can be bent in singular concepts, shapes, geometries, etc. and in multi-core configurations, the cores and/or core bodies can be glued, pancaked, welded, brazed, mechanically joined, or otherwise joined to create a desired stack and/or airfoil cavity configuration.

Stacks of core bodies as provided herein can be optimized for heat transfer and desired flow characteristics through and along an airfoil. The component (e.g., an airfoil), in some embodiments, can be additive manufactured with the desired internal cavity and/or flow path geometries to allow discharge on more than one surface and/or at multiple locations on a single surface of the airfoil. Accordingly, advantageously, discharge of cooling air can be provided onto multiple surfaces of an airfoil thus improving convective and conductive heat transfer by utilizing a single cavity and reducing the number and complexity of multiple cores, resulting in efficient film cooling.

Figure 2A:
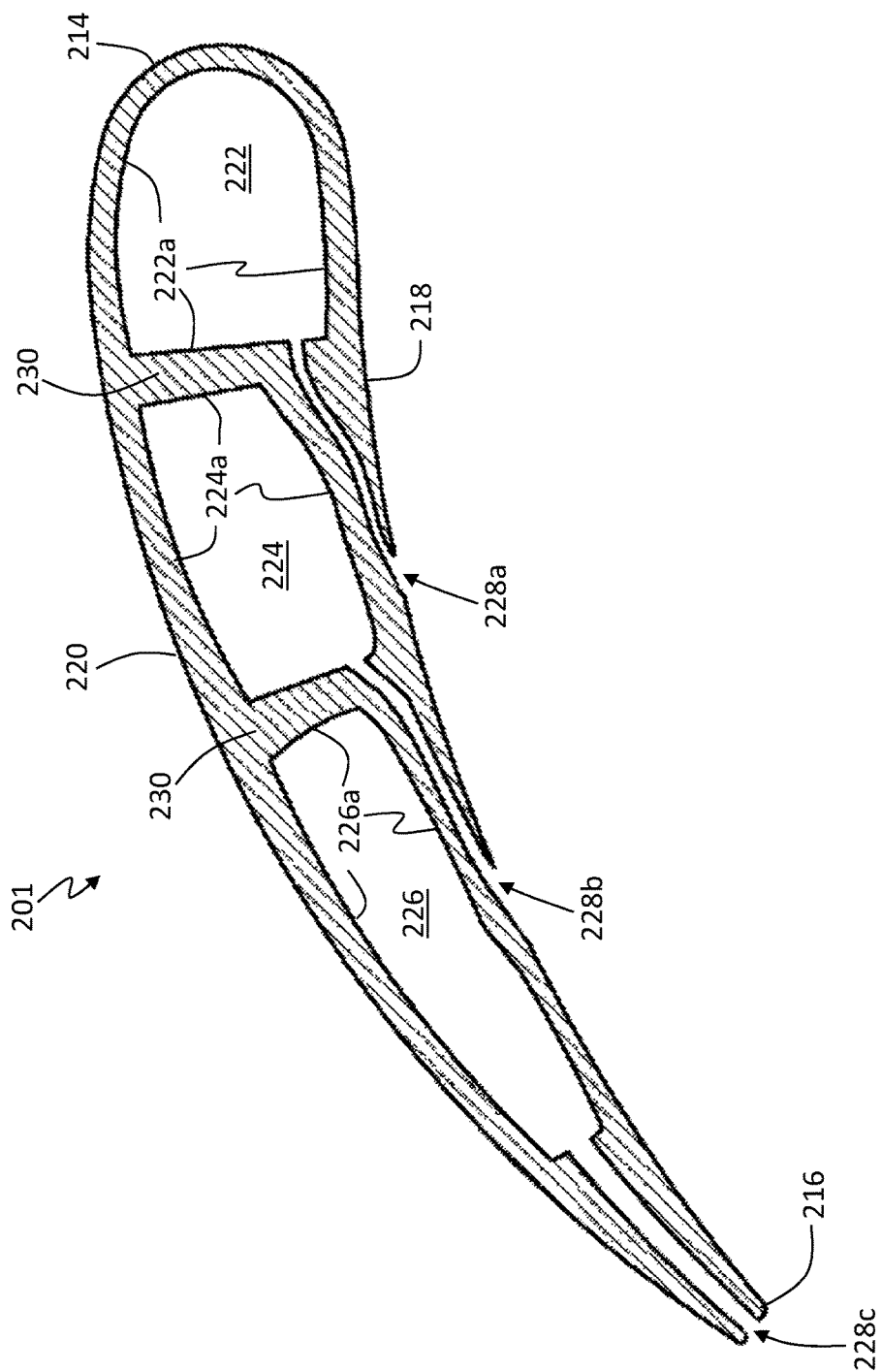
FIG. 2A is a cross-sectional illustration of an airfoil cast using the core assembly shown in FIG. 2B.
Figure 2B:
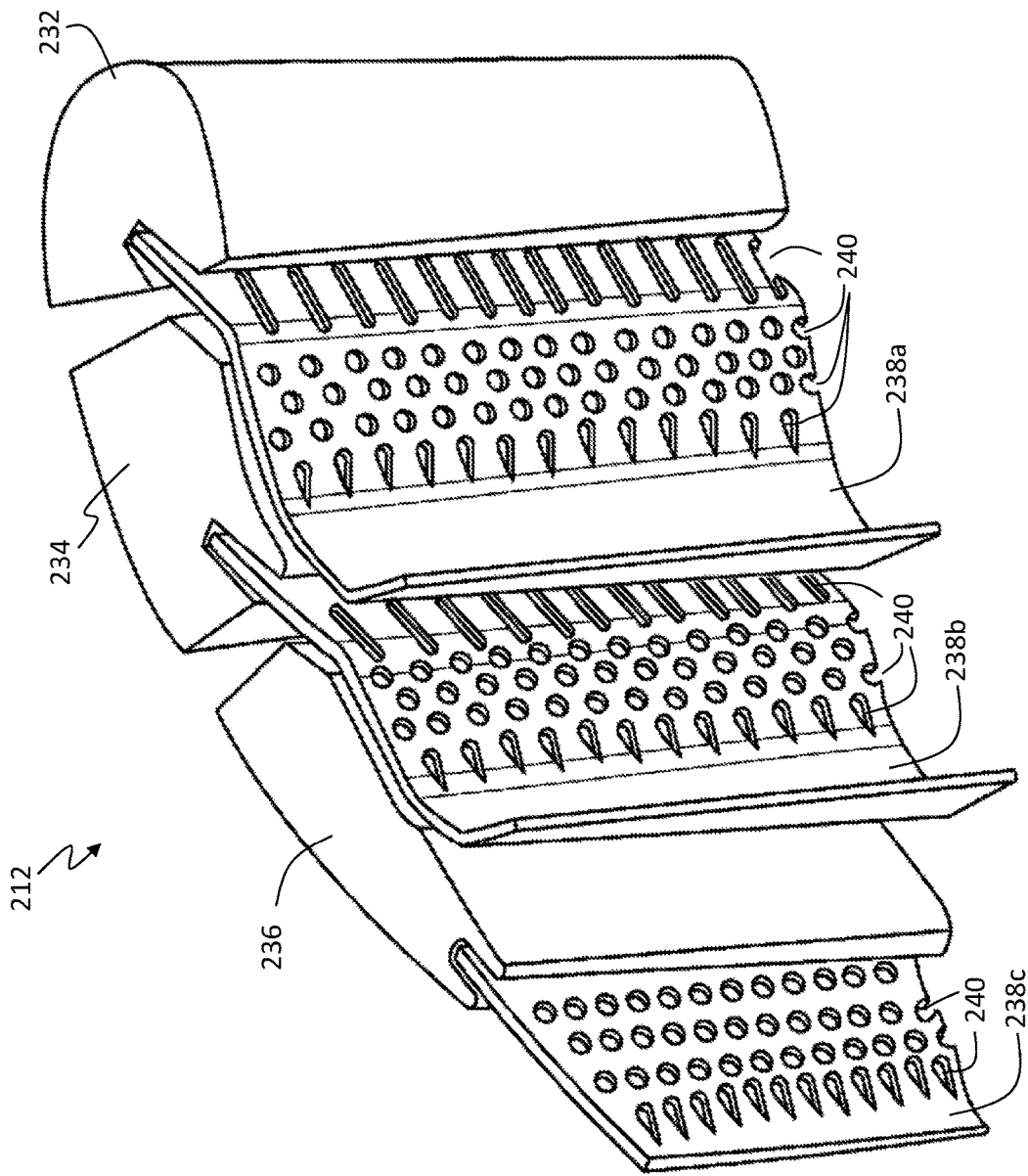
FIG. 2B is a perspective illustration of a core assembly used to form the airfoil of FIG. 2A.

Turning now to FIGS. 2A and 2B, schematic illustrations of an airfoil (FIG. 2A) and a core assembly (FIG. 2B) are shown. FIG. 2A is a cross-sectional illustration of an airfoil 201 cast using the core assembly 212 shown in FIG. 2B. FIG. 2B is a perspective illustration of the core assembly 212 used to form the airfoil 201 of FIG. 2A;

FIG. 2A illustrates a cross-sectional illustration of the airfoil 201 cast using the core assembly 212 illustrated in FIG. 2B. Airfoil 201 includes leading edge surface 214, trailing edge 216, pressure side surface 218, suction side surface 220, leading edge cavity 222, midchord cavity 224, trailing edge cavity 226, and cooling circuits 228a, 228b, and 228c. As a result of manufacturing process, leading edge cavity 222 is formed by a leading edge ceramic core, midchord cavity 224 is formed by a midchord ceramic core, and trailing edge cavity 226 is formed by a trailing edge ceramic core (see, e.g., FIG. 2B). Each cavity 222, 224, 226 is bounded by a respective cavity wall 222a, 224a, 226a. One or more ribs 230 separate the cavities 222, 224, 226. Each cooling circuit 228a, 228b, 228c is formed by one or more core bodies, such as RMCs (see FIG. 2B). As shown in FIG. 2A, cooling circuits 228a, 228b are positioned between a downstream cavity (e.g., 224, 226) and a side (e.g., pressure side surface 218) of airfoil 201.

As shown, cooling circuit 228a fluidly connects leading edge cavity 222 along a downstream portion of cavity wall 222a and extends between midchord cavity 224 and pressure side surface 218. As such, cooling fluid flowing through leading edge cavity 222 exits the cavity 222 and flows through cooling circuit 228a to cool the pressure side surface 218 of airfoil 201. Similarly, cooling circuit 228b joins with midchord cavity 224 along a downstream portion of cavity wall 224a and extends between trailing edge cavity 226 and pressure side surface 218. Cooling fluid exits midchord cavity 224 and flows through cooling circuit 228b to cool the pressure side surface 218 of airfoil 201 farther downstream of cooling circuit 228a. While FIG. 2A illustrates cooling circuits near the pressure side surface 218 of airfoil 201, cooling circuits can also be located between the cavities 222, 224, 226 and the suction side surface 220 of airfoil 201.

FIG. 2B illustrates a perspective view of one embodiment of a core assembly 212 for forming an airfoil 201. Core assembly 212 includes leading edge ceramic core 232, midchord ceramic core 234, and trailing edge ceramic core 236. A first core body 238a is configured with the leading edge ceramic core 232, a second core body 238b is configured with the midchord ceramic core 234, and a third core body 238c is configured with the trailing edge ceramic core 236. The ceramic cores 232, 234, 236 are used to form inner passages (e.g., cavities 222, 224, 226) for cooling fluid within the airfoil 201. The core bodies 238a, 238b, 238c are used to form cooling circuits (e.g., a network of cooling passages including cooling circuits 228a, 228b, 228c) within the airfoil 201. The cooling circuits 228a, 228b, 228c in the cast airfoil 201 will receive cooling fluid from the inner passage(s) 222, 224, 226 with which they are fluidly connected. In order for the cooling circuits 228a, 228b, 228c in the cast airfoil 201 to receive cooling fluid from the inner passages 222, 224, 226, the ceramic cores 232, 234, 236 and the core bodies 238a, 238b, 238c are in contact with one another. The core bodies 238a, 238b, 238c are secured to the appropriate ceramic core 232, 234, 236 to maintain contact during a casting process. In some embodiments, core assembly 212 can contain more than one midchord ceramic core 234 and associated downstream core body 238b.

In some non-limiting embodiments, the core bodies of the present disclosure, described above and below, can be refractory metal cores. However, those of skill in the art will appreciate that other materials can be used to form the core bodies without departing from the scope of the present disclosure.

Each of the core bodies 238a, 238b, 238c can include a plurality of openings 240, as shown. Once cast, openings 240 form a plurality of air disturbance features, include pedestals or other features, which direct cooling fluid through a respective cooling circuit 228a, 228b, 228c. Openings 240 can be circular, oblong, racetrack-shaped, teardrop-shaped, or any other shape depending on the flow control needs of the specific cooling circuit 228a, 228b, 228c. Although described above with respect to casting, those of skill in the art will appreciate that other manufacturing processes can be used without departing from the scope of the present disclosure. For example, additive manufacturing techniques can be used to form the structures and configurations of airfoils as provided herein.

Turning now to FIGS. 3A-4B, schematic illustrations of core bodies and/or core subassemblies in accordance with non-limiting embodiments of the present disclosure are shown. FIGS. 3A-3E are top-down illustrations of core bodies and core subassemblies in various configurations. FIG. 4A is a top-down illustration of a core body in accordance with a non-limiting embodiment and FIG. 4B is an elevational illustration of the core body of FIG. 4A. The core bodies and subassemblies of FIGS. 3A-4B can be used with ceramic cores or other structures to form core assemblies and define a positive structure of the internal cavities (i.e., negative space) within an airfoil, such as described above.

FIG. 3A is a first illustration of a core subassembly 338a that is constructed of two core bodies that are attached together. For example, as shown, a first core body 342a and a second core body 344a are bonded together to form the core subassembly 338a, thus forming a core body stack. The attachment between the first core body 342a and the second core body 344a can be by any known mechanism including, but not limited to, gluing, brazing, pancaking, welding (e.g., friction, heat, etc.), laser operations, forging, pressing, mechanical fixing, and/or other joining processes or mechanisms. Further, in some embodiments, the core bodies and/or the core assembly can be additively manufactured.

The core subassembly 338a includes a first portion 346a and a second portion 348a. In the embodiment of FIG. 3A, the first portion 346a forms a trunk 350a that is defined as the portion or section of the core subassembly 338a where the first core body 342a and the second core body 344a are attached. The trunk 350a has a first end 352a and a second end 354a. The trunk 350a is a structure or portion of the core subassembly 338a that is configured to join with or attach to a ceramic core or other core structure used to form a cavity within an airfoil. The first end 352a of the trunk 350a is thus free to be engaged with or otherwise interact with a cavity core structure and the second end 354a is opposite therefrom.

The second portion 348a is defined by one or more branches 356a that extend from the trunk 350a where the first core body 342a and the second core body 344a are not joined or attached (i.e., are separated from each other). In this embodiment, the first core body 342a defines one branch 356a and the second core body 344a defines another branch 356a, each extending from the second end 354a of the trunk 350a.

During manufacture of an airfoil based on, in part, the core subassembly 338a, the trunk 350a will form a relatively wide cooling circuit that can extend from a cavity of the airfoil (e.g., as shown and described above). However, due to the configuration and structure of the core subassembly 338a, the cooling circuit can include multiple passages that extend to different locations and/or surfaces of the airfoil and thus provide cooling at multiple locations on the exterior of the airfoil. The multiple passages are based on the configuration of the branches 356a of the second portion 348a of the core subassembly 338a.

FIG. 3B shows another configuration of a core subassembly 338b in accordance with an embodiment of the present disclosure. The core subassembly 338b is substantially similar to the core subassembly 338a of FIG. 3A and forms a similar cooling circuit in a manufactured airfoil. However, as shown in FIG. 3B, the core subassembly 338b is a unitary or single core body 342b. In this case, a trunk 350b is a portion of the single core body 342b and the branches 356b extend therefrom, with each branch 356b part of the single core body 342b. The trunk 350b is the portion of the core subassembly 338b that is configured to connect to or join with a ceramic core or other core structure that is used to form cavities of an airfoil.

FIG. 3C shows another configuration of a core subassembly 338c in accordance with an embodiment of the present disclosure. In this embodiment, a first core body 342c and multiple second core bodies 344c are connected on one side of the first core body 342c. In this configuration, a trunk 350c has multiple branches 356c extending therefrom. As shown, one of the branches 356c extends from a point between a first end 352c and a second end 354c of the trunk 350c. In an alternative configuration, the two second core bodies 344c shown in FIG. 3C can be formed as a single, second core body without departing from the scope of the present disclosure.

Figure 3D:
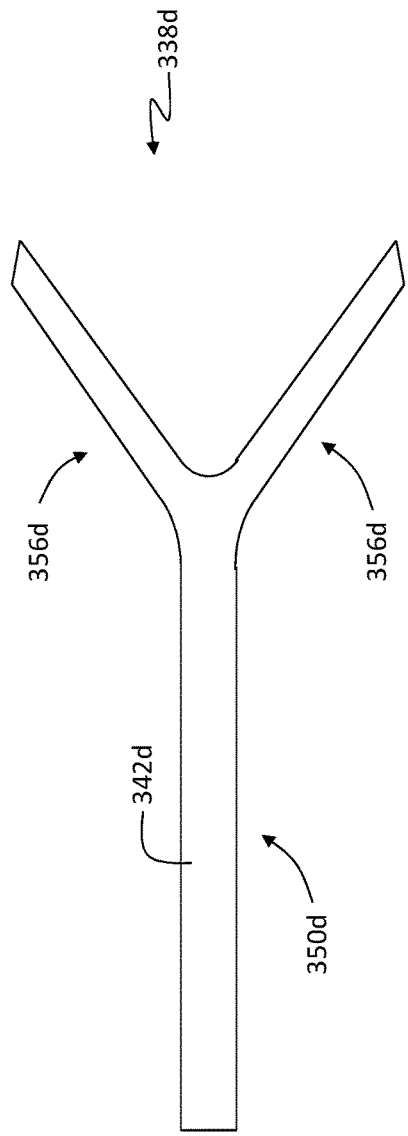
FIG. 3D is a top-down schematic illustration of another core subassembly in accordance with a non-limiting embodiment of the present disclosure.

FIG. 3D shows another configuration of a core subassembly 338d in accordance with an embodiment of the present disclosure. The core subassembly 338d of FIG. 3D is a unitary, single core body 342d with a trunk 350d and multiple branches 356d extending from the trunk 350d. As shown in the embodiment of FIG. 3D, the branches 356d extend at different angles and form a "Y" configuration with the trunk 350d.

Figure 3E:
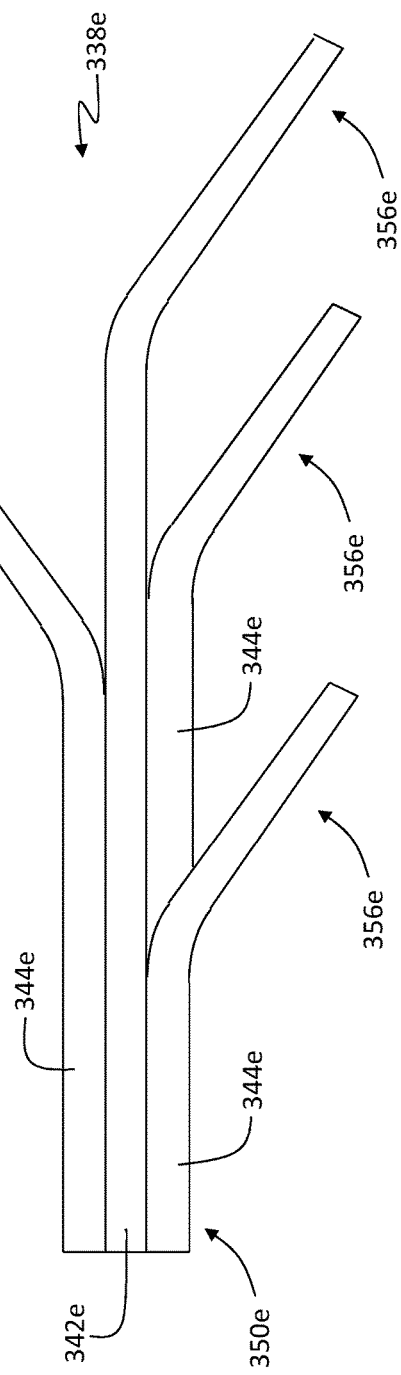
FIG. 3E is a top-down schematic illustration of another core subassembly in accordance with a non-limiting embodiment of the present disclosure.

FIG. 3E shows another configuration of a core subassembly 338e in accordance with an embodiment of the present disclosure. FIG. 3E illustrates that multiple second core bodies 344e can be attached to a first core body 342e. As shown, one second core body 344e is attached on a first side of the first core body 342e and multiple second core bodies 344e are attached on a second (and opposite) side of the first core body 342e. The trunk 350e is defined as any section of the core subassembly 338e where different core bodies 342e, 344e are attached. As shown, the branches 356e can extend from the trunk 350e from multiple locations along the length of the trunk 350e.

Turning now to FIGS. 4A-4B, another configuration of a core subassembly 438 in accordance with an embodiment of the present disclosure is shown. FIG. 4A shows a top-down illustration of the core subassembly 438 and FIG. 4B shows an elevational illustration of the core subassembly 438. As shown, the core subassembly 438 includes a single core body 442 defining a trunk 450 and a plurality of branches 456a, 456b extending therefrom. A first set of branches 456a are configured to extend in a first direction relative to the trunk 450 and a second set of branches 456b are configured to extend in a second direction relative to the trunk 450. As shown, each branch 456a, 456b is angled from a second end 454 of the trunk 450 (as illustrated by the dashed line in FIGS. 4A-4B). In the embodiment of FIGS. 4A-4B, the two sets of branches 456a, 456b are shown alternating in configuration. However, those of skill in the art will appreciate that any pattern or configuration of branches can be employed without departing from the scope of the present disclosure.

Those of skill in the art will appreciate that various alternative configurations and/or geometries are enabled by the present disclosure. Further, several of the above described embodiments can be combined and/or altered to form a desired cooling circuit within an airfoil. In some embodiments, a portion of the trunk (e.g., where at least two core bodies are joined) can extend the full length of the core assembly, such that a wider cooling circuit passageway can be formed for the length of the trunk. Additionally, in some configurations, the trunk can bend, turn, or otherwise have a different geometry than a relatively straight line/body, as shown above.

Further, in some embodiments, one or more of the core bodies used to form a core subassembly or core assembly of the present disclosure can include openings (e.g., openings 240 of FIG. 2B) to form a plurality of pedestals or other features that direct cooling fluid through a respective cooling circuit. The openings can be circular, oblong, racetrack-shaped, teardrop-shaped, or any other shape. Further, in some embodiments, two joined core bodies can be configured to match or align openings of the two core bodies. Moreover, in some embodiments, one core body can include openings while the other core body does not include openings, thus forming a unique interior structure to the cooling circuits when the airfoil is formed from the core assembly including the two different core bodies. Still further, multiple of the core bodies can be configured with openings that do not align, or some openings that align and other that do not, thus enabling unique pedestal structures and/or configurations.

Figure 6:
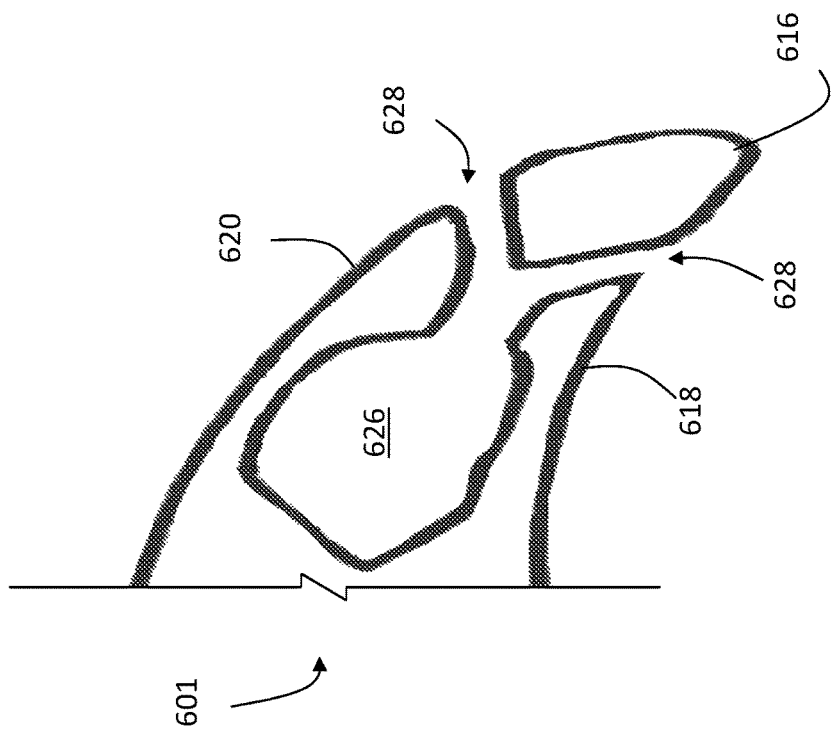
FIG. 6 is a cross-sectional illustration of a trailing edge of another airfoil formed using a core assembly in accordance with a non-limiting embodiment of the present disclosure.
Figure 5:
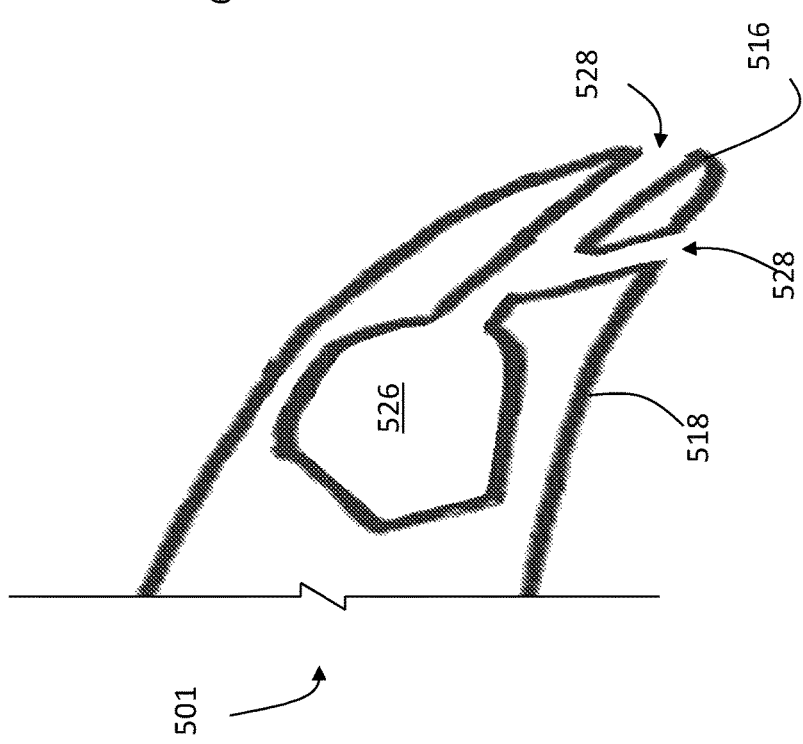
FIG. 5 is a cross-sectional illustration of a trailing edge of an airfoil formed using a core assembly in accordance with a non-limiting embodiment of the present disclosure.
Figure 7:
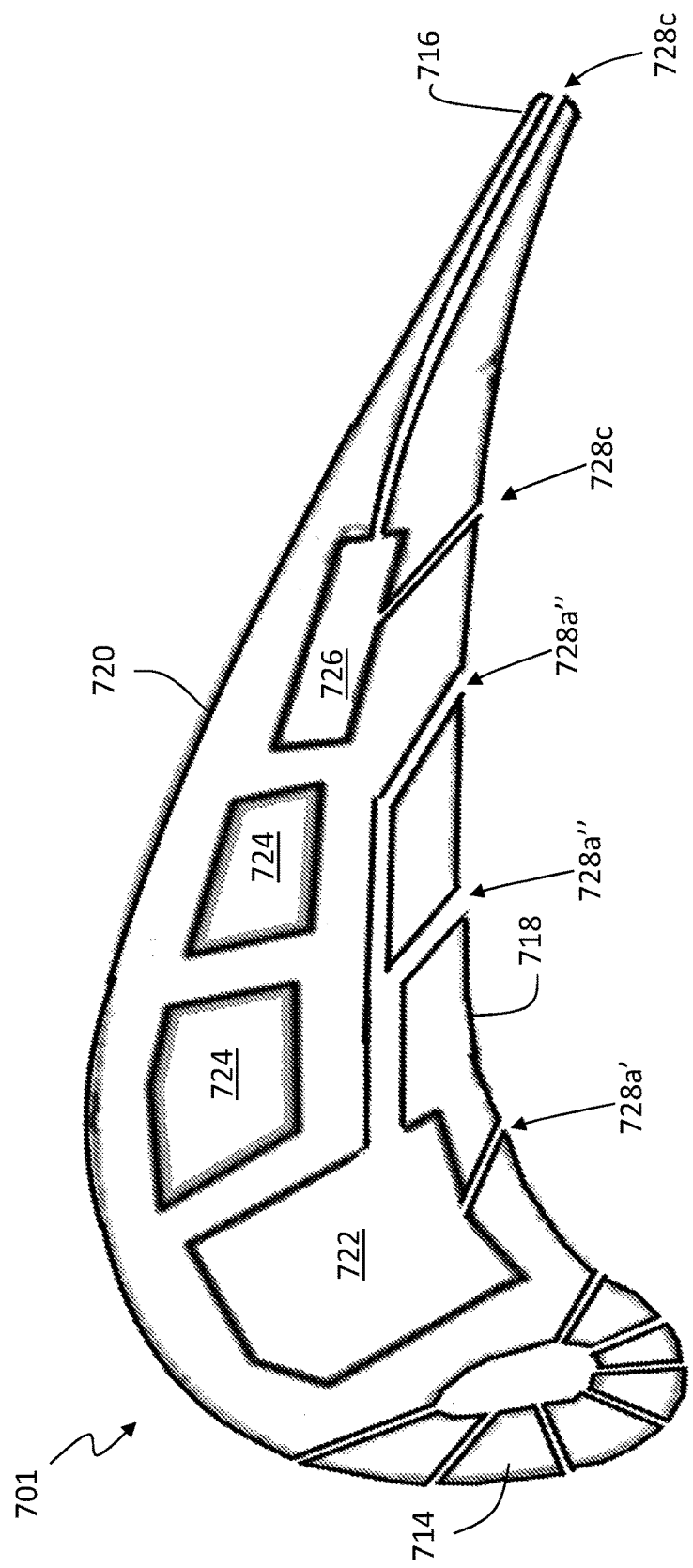
FIG. 7 is a cross-sectional illustration of an airfoil formed using a core assembly in accordance with a non-limiting embodiment of the present disclosure.

Turning now to FIGS. 5-7, schematic illustrations of airfoils formed from core assemblies and subassemblies as provided herein are shown. FIGS. 5-6 each show a trailing edge of respective airfoils and FIG. 7 shows an airfoil extending from a leading edge to a trailing edge. Each of FIGS. 5-7 is a cross-sectional, top-down view of the interior structure of the respective airfoils.

With reference to FIG. 5, airfoil 501 includes a trailing edge cavity 526 that is fluidly connected to exterior surfaces of the airfoil 501 by cooling circuit 528. As shown, cooling circuit 528 has two exits with one exit configured near the trailing edge 516 but being open on a pressure side surface 518. The other of the exits of the cooling circuit 528 is formed in the trailing edge 516 of the airfoil 501. The airfoil 501 is manufactured using at least one core subassembly similar to that shown and described above. For example, the configuration and geometry of the cooling circuit 528 of FIG. 5 could be formed using a core subassembly similar to that shown in either FIG. 3A or FIG. 3B. As shown, the trunk of the core subassembly would be connected to a ceramic core that forms the trailing edge cavity 526, and the branches of the core subassembly would extend toward the trailing edge.

FIG. 6 shows an alternative configuration of a trailing edge 616 of an airfoil 601 in accordance with an embodiment of the present disclosure. The airfoil 601 includes a trailing edge cavity 626 with a cooling circuit 628 extending from the trailing edge cavity 626 toward the trailing edge 616. However, in this embodiment, as shown, the cooling circuit 628 has two exits that open onto each of the pressure surface side 618 and the suction surface side 620. The cooling circuit 628 can be formed, for example, by a core subassembly similar to that shown in FIG. 3D.

Turning now to FIG. 7, an airfoil 701 is shown. The airfoil 701 extends from a leading edge 714 to a trailing edge 716. As shown, the airfoil 701 includes a leading edge cavity 722, two midchord cavities 724, and a trailing edge cavity 726. The trailing edge cavity 726 includes two separate cooling circuits 728c, with one exiting onto a pressure side surface 718 and one exiting at the trailing edge 716. Further, as shown in the embodiment of FIG. 7, the airfoil 701 does not include any cooling circuits connected to the midchord cavities 724, although those of skill in the art will appreciate that cooling circuits could be formed therewith (e.g., fluidly exiting from the midchord cavities 724 to a suction side surface 720.

The leading edge cavity 722 includes multiple cooling circuits 728a. As shown, a first cooling circuit 728a' can connect the leading edge cavity 722 to the pressure side surface 718 by a single passaged cooling circuit. Additionally, the leading edge cavity 722 is fluidly connected to the pressure side surface 718 by a second cooling circuit 728a" that is formed by a core subassembly in accordance with the present disclosure. As shown, the second cooling circuit 728a" has a larger section near the leading edge cavity 722 (e.g., formed by the trunk of the RMC) and two separate exits exiting onto the pressure surface side 718 (e.g., each formed by a branch of the core subassembly).

Figure 8:
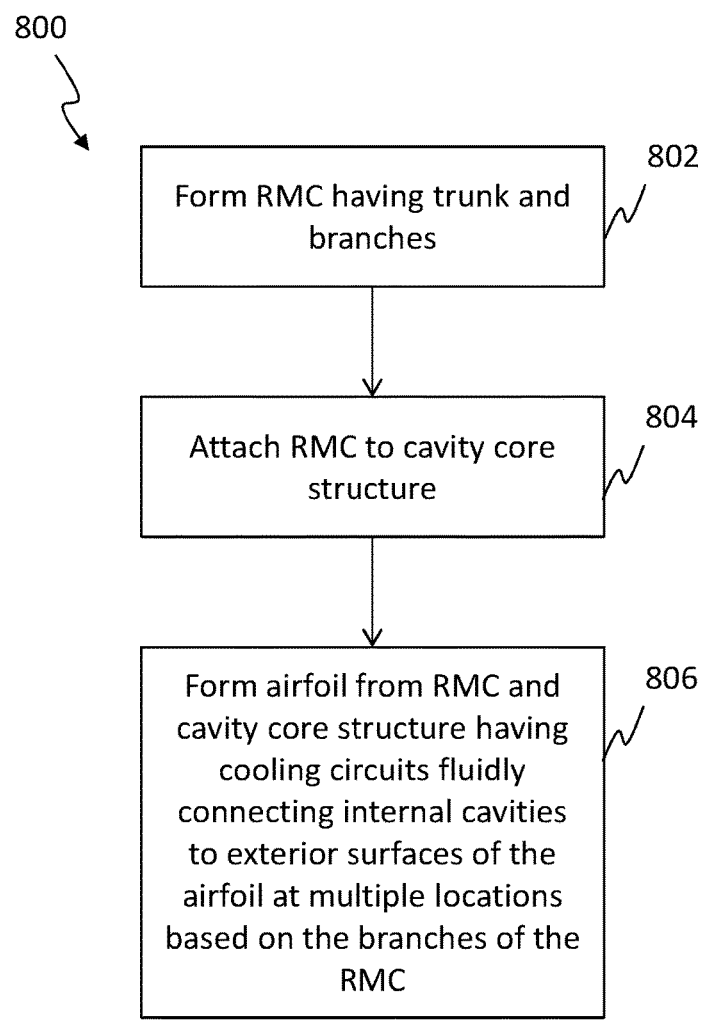
FIG. 8 is a flow process for manufacturing a component of a gas turbine engine in accordance with a non-limiting embodiment of the present disclosure.

Turning now to FIG. 8, a flow process for forming or manufacturing an airfoil having cooling circuits as shown and described above is shown. The flow process 800 involves a casting process for the airfoil based on ceramic cores and core assemblies using RMCs. However, alternative manufacturing techniques can be used to form an airfoil having internal structures and/or configurations as described herein. For example, although discussed with respect to RMC, this is merely for explanatory purposes and other materials or types of subassemblies can be employed without departing from the scope of the present disclosure. Thus, the flow process 800 is not intended to be limiting, but rather is provided for illustrative purposes.

At block 802, an RMC having a trunk and branches formed thereon is formed. In some configurations, the formation of the RMC can be by additive manufacturing, with the trunk and branches integrally formed in a single piece or component. In other embodiments, the formation of the RMC can involve attaching or joining multiple RMC bodies to form the RMC having a trunk at the portions where at least two RMC bodies are joined or attached and branches where an RMC body is not attached to another RMC body. The attachment or joining of the RMC bodies can be by any known means and can include welding, gluing, laser operations, mechanically fixing, etc. In some configurations, a branch (as described above) can be attached to another RMC body and the trunk can be a portion of the RMC body that is configured to interact with a cavity core structure, as shown and described above. In some embodiments, the branches can be formed by bending a portion or portions of the RMC body (e.g., as shown in FIGS. 4A-4B).

The RMC can then be attached to a cavity core structure, as shown at block 804. In some embodiments, the cavity core structure may be a ceramic core. The attachment between the RMC and the cavity core structure may be by any means, as will be appreciated by those of skill in the art.

At block 806, an airfoil can be formed from the RMC and cavity core structure. The formed airfoil includes cooling circuits fluidly connecting internal cavities to exterior surfaces of the airfoil at multiple locations based on the branches of the RMC. That is, the cavity core structure can form the internal cavities and the RMC (trunk and branches) can form the cooling circuits, as shown and described herein.

Figure 9:
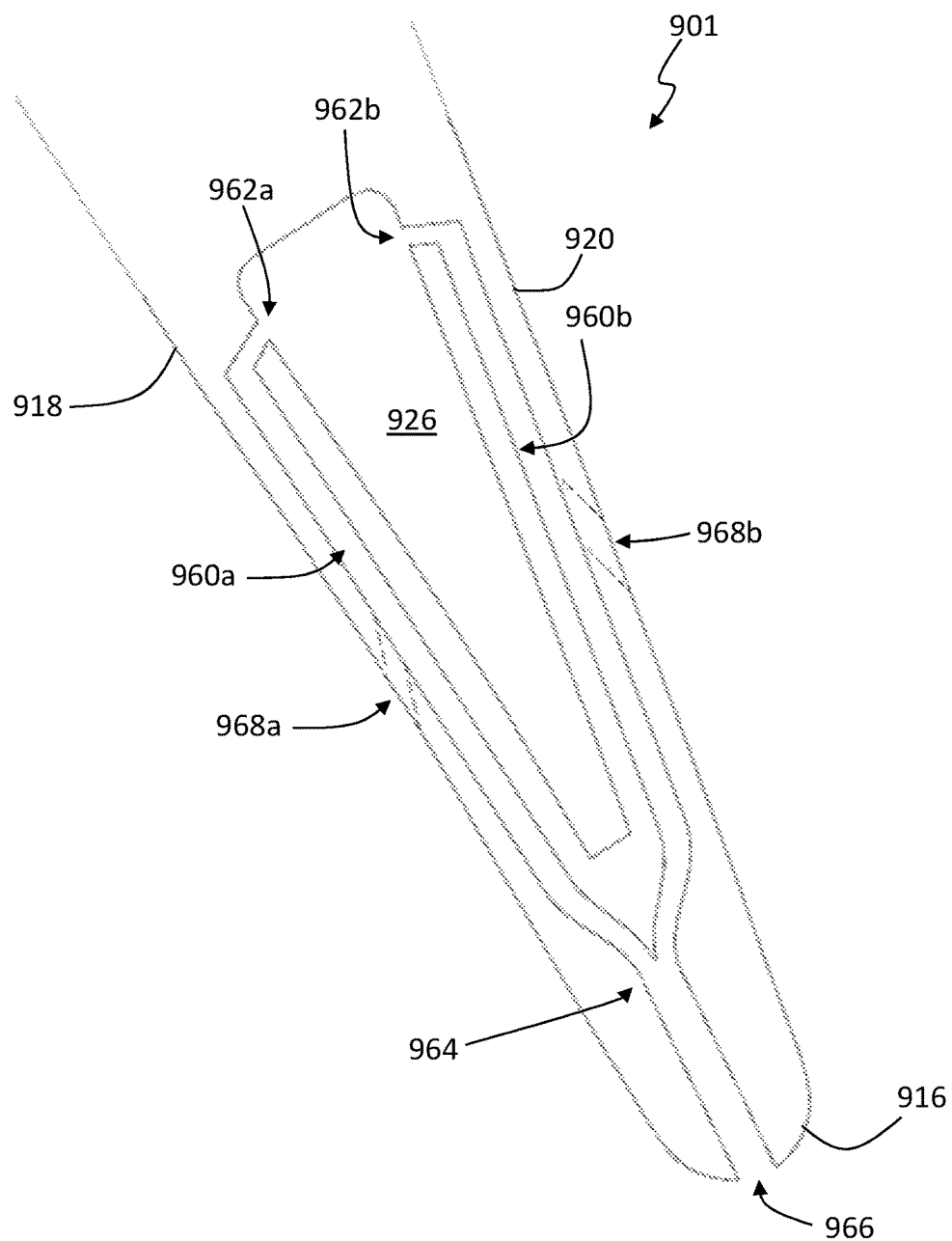
FIG. 9 is a cross-sectional illustration of an airfoil formed using a core assembly in accordance with a non-limiting embodiment of the present disclosure.

Turning now to FIG. 9, a schematic illustration of an airfoil 901 having features in accordance with a non-limiting embodiment of the present disclosure is shown. The airfoil 901 extends from a leading edge (not shown) to a trailing edge 916. As shown, the airfoil 901 includes a trailing edge cavity 926. The trailing edge cavity 926 includes two separate cooling circuits 960a, 960b that fluidly connect to the trailing edge cavity 926 at two separate locations 962a, 962b (e.g., a pressure side opening 962a and a suction side opening 962b). As shown, the two separate cooling circuits 960a, 960b fluidly connect at a junction 964 and exit at the trailing edge 916 at a trailing edge exit 966.

Further, as shown in the embodiment of FIG. 9, each of the cooling circuits 960a, 960b includes a side exit (e.g., pressure side exit 968a or suction side exit 968b). For example, in this embodiment, as shown, a pressure side cooling circuit 960a on a pressure side of the airfoil 901 has a pressure side exit 968a that opens on or through a pressure side surface 918 of the airfoil 901. Similarly, a suction side cooling circuit 960b on a suction side of the airfoil 901 has a suction side exit 968b that opens on or through a suction side surface 920 of the airfoil 901.

Figure 10A:
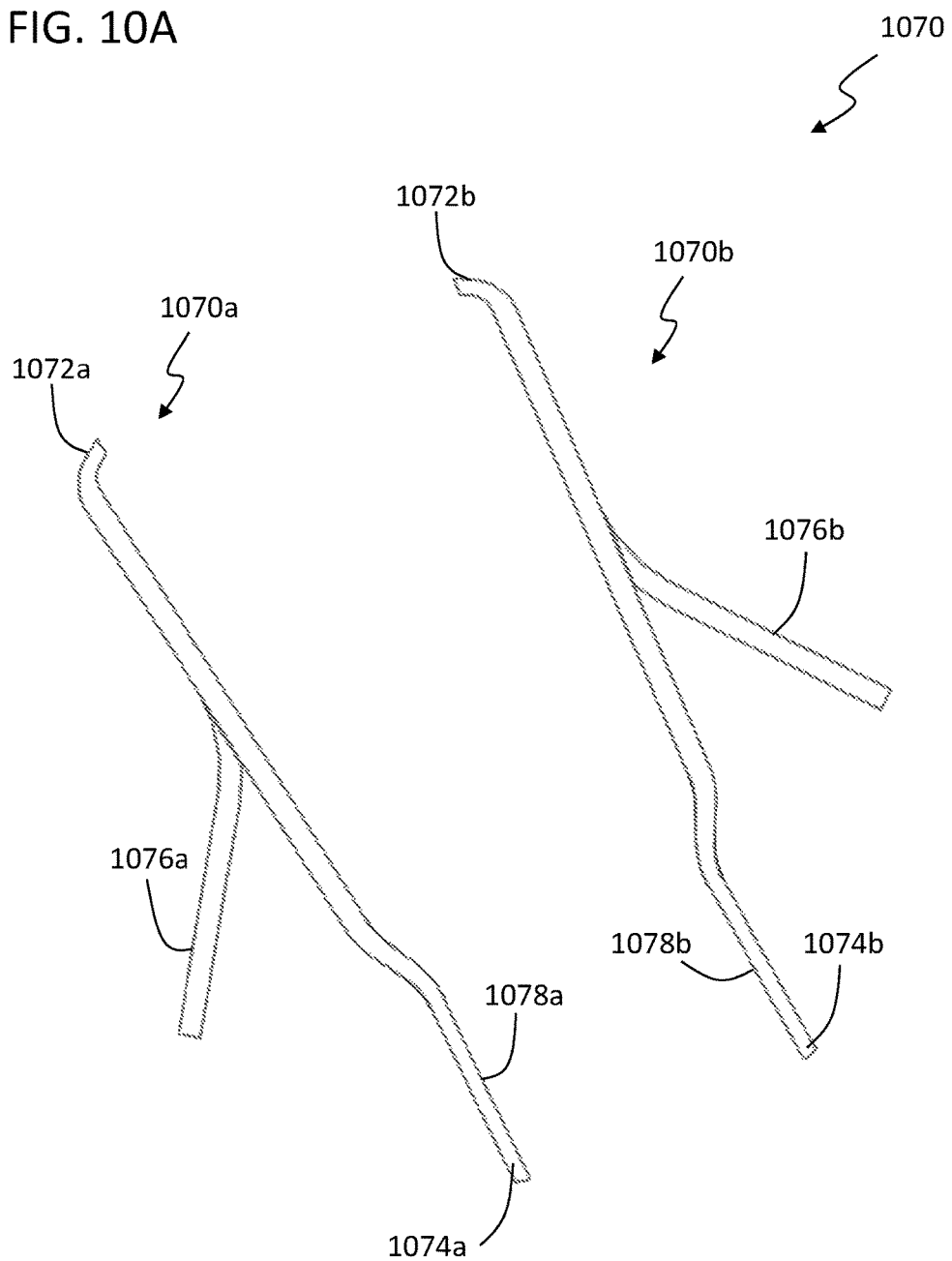
FIG. 10A is a cross-sectional illustration of a subassembly that forms a portion of a core assembly, having a first core body and a second core body, in accordance with an embodiment of the present disclosure.
Figure 10B:
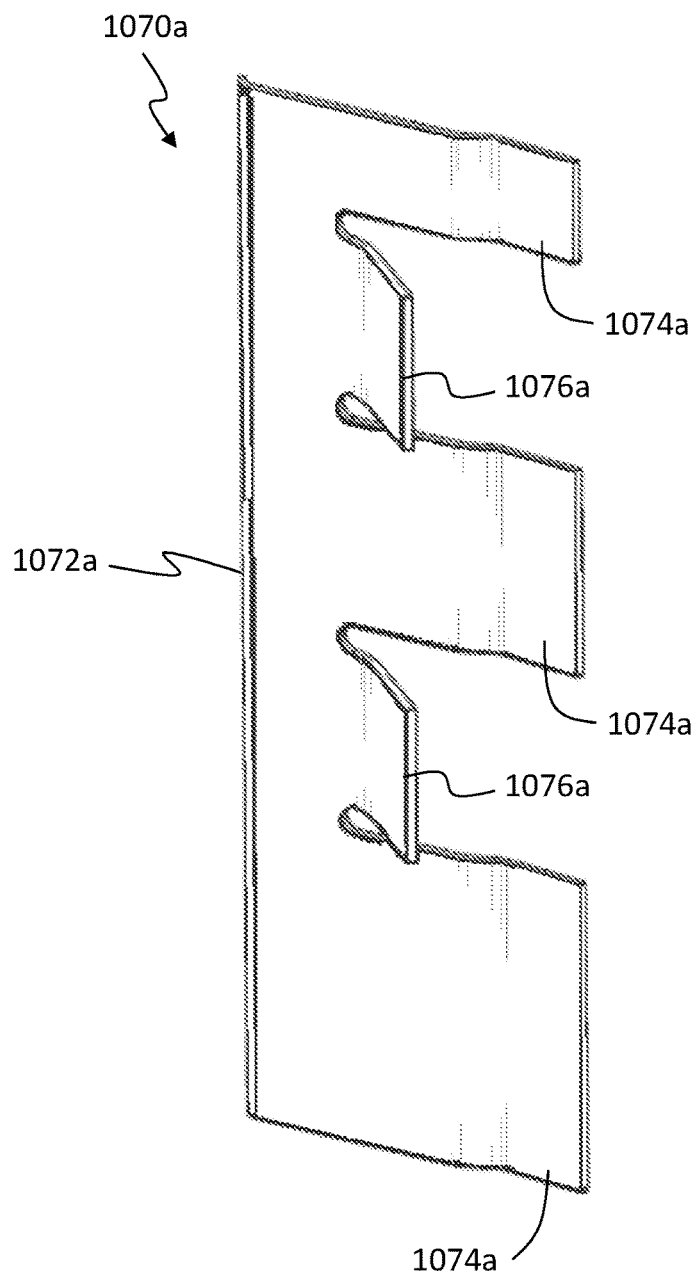
FIG. 10B is an isometric illustration of the first core body of FIG. 10A, the second core body being a mirror image thereof.

The separate and then joined cooling circuits 960a, 960b can be formed within the airfoil 901 through use of core assemblies, core subassemblies, and/or core bodies similar to that shown and described above. For example, turning now to FIGS. 10A-10B, schematic illustrations of a core subassembly 1070 used to form the cooling circuits shown in FIG. 9 are shown. FIG. 10A is a cross-sectional view illustration of a first core body 1070a and a second core body 1070b that are separated, but can be joined to form the cooling circuit described above with respect to FIG. 9. FIG. 10B is an isometric illustration of the first core body 1070a, with the second core body 1070b being a mirror of the first core body 1070a. The first and second core bodies 1070a, 1070b can be joined to form the core subassembly 1070.

As shown in FIGS. 10A-10B, the core bodies 1070a, 1070b each have a respective trunk 1072a, 1072b that is configured to join with or attach to a ceramic core or other core structure used to form a cavity within an airfoil. One or more first branches 1074a, 1074b and one or more second branches 1076a, 1076b can extend from the respective trunks 1072a, 1072b (e.g., laterally or vertically on the refractory metal core body). As will be appreciated by those of skill in the art, the first branches 1074a, 1074b can form the portion of the cooling circuit within the airfoil that exits at a trailing edge of the airfoil (e.g., as shown in FIG. 9). The second branches 1076a, 1076b can form portions of a cooling circuit that exits on a pressure or suction side of the airfoil. For example, the second branch 1076a of the first core body 1070a can be used to form a cooling circuit that exits an airfoil on the pressure side surface of the airfoil. Similarly, for example, the second branch 1076b of the second core body 1070b can be used to form a cooling circuit that exits the airfoil on the suction side surface of the airfoil.

To form the core subassembly 1070, the two core bodies 1070a, 1070b are joined or attached. For example, a first joining surface 1078a can be defined on the first branch 1074a of the first core body 1070a and a second joining surface 1078b can be defined on the first branch 1074b of the second core body 1070b. The joining surfaces 1078a, 1078b can be configured to enable joining of the first core body 1070a to the second core body 1070b by means of glue, pancaking (e.g., press-fusion), welding, brazing, mechanical joining, or other joining mechanism or procedure to create a desired stack and thus form the core subassembly 1070.

As shown in FIG. 10B, the first core body 1070a is illustrated in an isometric view, illustrating the nature of the first and second branches 1074a, 1076a. As shown, the second branches 1076a are bent or skewed relative to the first branches 1074a, and thus enable different exits for cooling cavities on one or more surfaces of an airfoil formed based on the core subassembly 1070.

Figure 11:
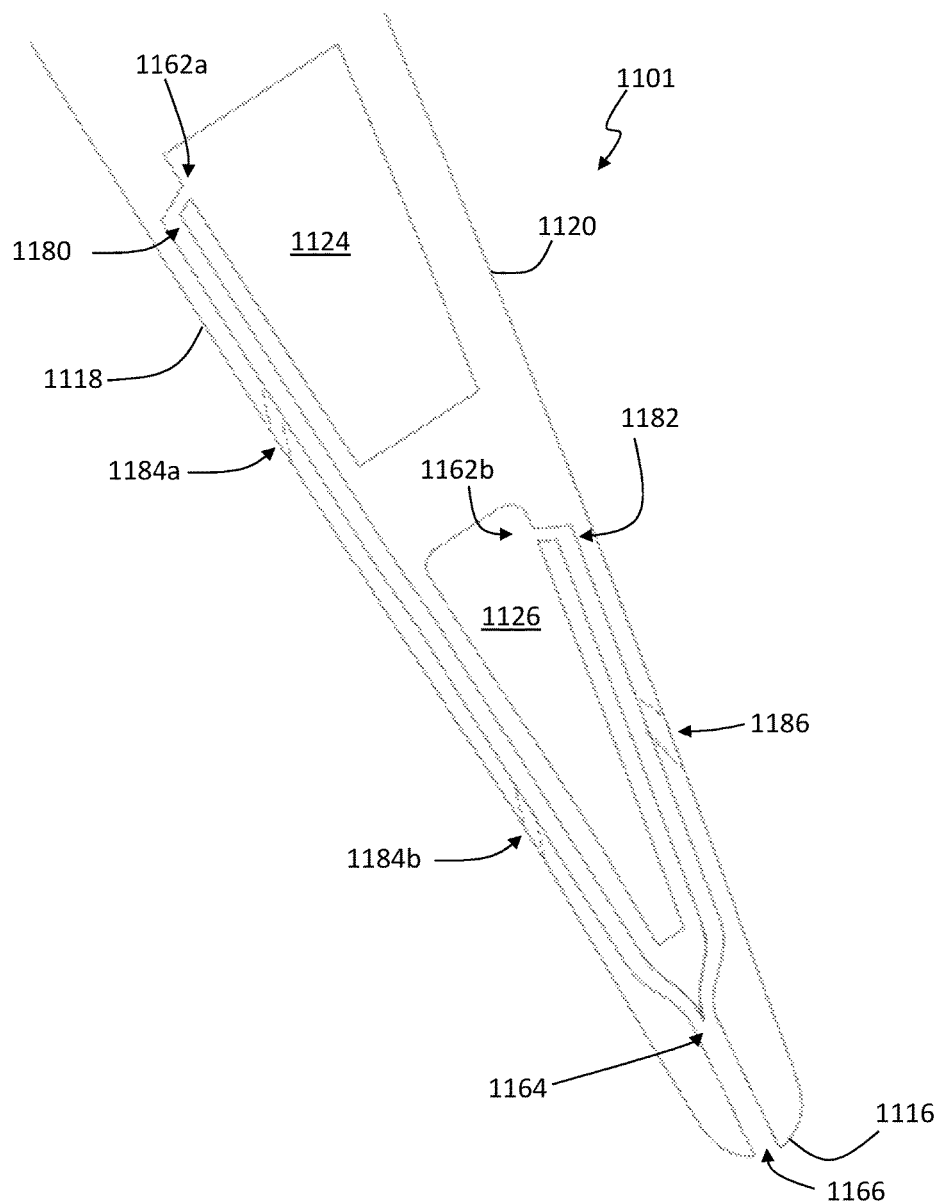
FIG. 11 is a cross-sectional illustration of an airfoil formed using a core assembly in accordance with a non-limiting embodiment of the present disclosure.

Turning now to FIG. 11, an airfoil 1101 is shown. The airfoil 1101 extends from a leading edge (not shown) to a trailing edge 1116. As shown, the airfoil 1101 includes a midchord cavity 1124 and a trailing edge cavity 1126. In this embodiment, each of the cavities 1124, 1126, is fluidly connected to a respective cooling circuit 1180, 1182. As shown, the two cooling circuits 1180, 1182 fluidly connect at a junction 1164 and exit at a trailing edge 1116 at a trailing edge exit 1166 of the airfoil 1101. Each of the cooling circuits 1180, 1182 can be formed, in part, by separate core bodies or core subassemblies, as described above. However, as shown and similar to that described with respect to FIGS. 9-10B, the two core bodies can be joined toward a trailing edge to form the trailing edge exit 1166 where the junction 1164 is formed and the two cooling circuits 1180, 1182 merge.

Further, as shown in the embodiment of FIG. 11, each of the cooling circuits 1180, 1182 includes one or more side exits (e.g., pressure side exit 1184a, 1184b or suction side exit 1186). For example, in this embodiment, as shown, a pressure side cooling circuit 1180 on a pressure side of the airfoil 1101 has a first pressure side exit 1184a and a second pressure side exit 1184b that each open on or through a pressure side surface 1118 of the airfoil 1101. A suction side cooling circuit 1182 on a suction side of the airfoil 1101 has a suction side exit 1186 that opens on or through a suction side surface 1120 of the airfoil 1101.

As shown in FIGS. 9-11, two or more core bodies or core subassemblies can be configured to fluidly connect to one or more internal cavities of an airfoil, and then join proximate to an exit from the airfoil, thus forming cooling circuits as shown and described herein. Although certain geometries are shown and described herein, those of skill in the art will appreciate that various other geometries of core assemblies, core subassemblies, core bodies, and/or cooling circuits can be formed using embodiments of the present disclosure.

Advantageously, embodiments described herein can provide improved high temperature applications for airfoil. For example, using core subassemblies as provided herein can be employed to optimize pressure side film cooling, while allowing for a more conventional serpentine cavity (e.g., midchord cavities) to be dedicated on the suction side of the airfoil.

The double-stack core subassembly (or stack of core bodies) of some embodiments provided herein can be configured to provide superposition of slot film effectiveness on the pressure side of the airfoil and greatly benefit the trailing edge temperatures. Further, multiple core body and/or core subassembly insertions into the ceramic cores can be minimized. That is, core subassemblies and core bodies as provided herein can be joined to a ceramic core at a single location (e.g., single trunk) and still provide multiple exits (e.g., branches) at various locations on the exteriors surfaces of the airfoil.

Further, advantageously, embodiments provided herein can provide cooling discharge on pressure side, suction side, trailing edge, top and/or bottom platform, and/or combinations thereof. That is, advantageously, cooling flow is enabled on multiple sides of a component from a single internal cavity of the component. Advantageously, such cooling can enable product life improvement which can decrease product life cycle costs.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward", "aft", "upper", "lower", "above", "below", and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, although shown and described with respect to airfoils (e.g., vanes and blades) embodiments provided herein can be used in the manufacture of blade outer air seals, combustor panels, or other components that employ fluid cooling. Moreover, although primarily described with respect to conventional casting, additive manufacturing and machining methods can be used without departing from the scope of the present disclosure.

Accordingly, the present disclosure is not to be seen as limited by the foregoing description, but is only limited by the scope of the appended claims.

What is claimed is:

1. A core assembly for manufacturing a component of a gas turbine engine, the core assembly comprising:
    a first core body having a first trunk configured to attach to a first location of a cavity core structure, a first branch of the first core body extending from the first trunk and configured to form a first portion of a first cooling circuit in the component, the first branch having a first joining surface; and
    a second core body having a second trunk configured to attach to a second location of a cavity core structure, a first branch of the second core body extending from the second trunk and configured to form a first portion of a second cooling circuit in the component, the first branch of the second core body having a second joining surface joined to the first joining surface to form a junction,
    wherein the junction defines a merger of the first cooling circuit and the second cooling circuit proximate to an exit of the first and second cooling circuits from the component,
    wherein the first location is on a first internal cavity core structure and the second location is on second internal cavity core structure that is different from the first internal cavity core structure.

2. The core assembly of claim 1, wherein the first core body includes a second branch extending from the first trunk to define a second exit of the first cooling circuit.

3. The core assembly of claim 2, wherein the second exit is formed in one of a pressure side surface or a suction side surface of the component.

4. The core assembly of claim 2, wherein the second core body includes a second branch extending from the second trunk to define a second exit of the second cooling circuit.

5. The core assembly of claim 4, wherein the second exit of the first cooling circuit and the second exit of the second cooling circuit are on opposite side surfaces of the component.

6. The core assembly of claim 1, wherein at least one of the first core body and the second core body is a refractory metal core.

7. The core assembly of claim 1, wherein the first core body and the second core body are attached at the junction by at least one of welding, gluing, forging, pressing, laser operations, or mechanical attachment.

8. The core assembly of claim 1, wherein at least one of the first core body and the second core body includes a plurality of openings configured to form a plurality of air disturbance features in the component.

9. The core assembly of claim 1, wherein the first location and the second location are different from each other.

10. A component for a gas turbine engine comprising:
    a cavity formed inside the component and defining a cooling flow path within the component;
    a first cooling circuit fluidly connecting the cavity to an exterior of the component, wherein the first cooling circuit comprises a first portion and a second portion wherein the first portion of the cooling circuit and the second portion of the cooling circuit are configured to define a first exit and a second exit at two different locations on the exterior of the component, and wherein the first portion and the second portion extend from a trunk portion of the first cooling circuit; and
    a second cooling circuit formed within the component and merging with the first cooling circuit proximate the first exit of the first cooling circuit,
    wherein the second cooling circuit is fluidly connected to a second cavity different from the cavity the first cooling circuit is fluidly connected to.

11. The component of claim 10, wherein at least one of the trunk portion, the first portion of the cooling circuit, or the second portion of the cooling circuit includes a plurality of air disturbance features in the cooling circuit.

12. The component of claim 10, wherein the first exit is on an end of the component and the second exit of the first cooling circuit is on a pressure side surface or suction side surface of the component.

13. The component of claim 10, wherein the second cooling circuit has a second exit separate from the location of the merging with the first cooling circuit.

14. A method of forming a core for a component of a gas turbine engine, the method comprising:
    forming a core assembly having a first core body with a trunk that attaches to a cavity core structure, a first branch extending from the trunk and configured to form a first portion of a first cooling circuit in the component, and a second branch extending from the trunk and configured to form a second portion of the first cooling circuit in the component, the first branch of the first core body having a first joining surface;
    attaching a second core body to the first core body at the first joining surface to form a junction, the second core body configured to define a second cooling circuit within the component; and
    attaching the first core body to a cavity core structure,
    wherein the junction of the first core body and the second core body define a merging of the first and second cooling circuits proximate an end of the component; and
    attaching the second core body to a different cavity core structure than the cavity core structure the first core body is attached to.

15. The method of claim 14, further comprising forming a component having an interior cavity based on the cavity core structure and cooling circuits defined by the first and second core bodies.

* * * * *